C. J. CLEMENTS.
EXPANSION BOLT.
APPLICATION FILED OCT. 8, 1915.
1,197,606. Patented Sept. 12, 1916.
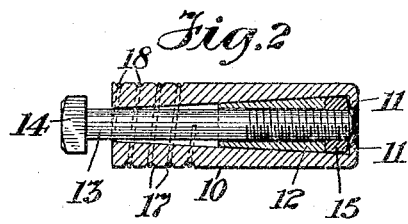
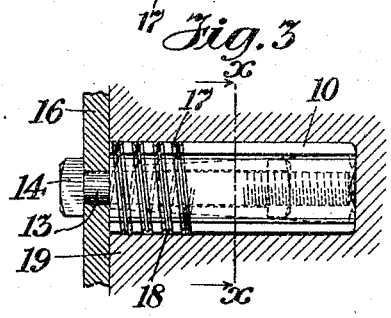
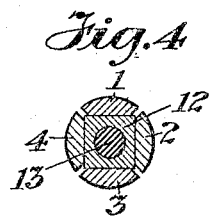
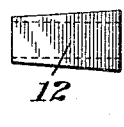
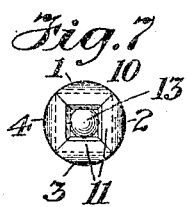
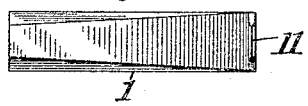
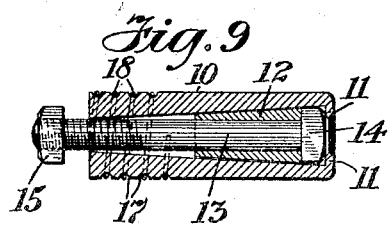
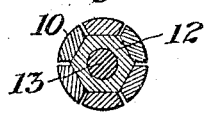
INVENTOR
Charles J. Clements
BY Serrell & Son
HIS ATTORNEYS

UNITED STATES PATENT OFFICE.

CHARLES J. CLEMENTS, OF NEW YORK, N. Y.

EXPANSION-BOLT.

1,197,606.  Specification of Letters Patent.  Patented Sept. 12, 1916.

Application filed October 8, 1915. Serial No. 54,716.

*To all whom it may concern:*

Be it known that I, CHARLES J. CLEMENTS, a citizen of the United States, residing in the borough of Brooklyn, in the county of Kings, city and State of New York, have invented an Improvement in Expansion-Bolts, of which the following is a specification.

My invention relates to expansion bolts of the general character described and shown in my application for Letters Patent Serial No. 23,875, filed April 26, 1915, wherein the expansion of a segmental tube provides a uniform bearing the entire length of the tube within the hole or recess into which it is inserted.

One object of my present invention is to dispense with the necessity of cutting openings and grooves in the tube sections as in my prior device above named, and also to dispense with the ribs or projections usually employed upon the expander nuts heretofore used.

Another object of my invention is to provide a rectangular or hexagonal expander having a smooth bore, and a reversible headed bolt passing through the smooth bore in the expander, whereby when desired the tube may be expanded in place before attaching the article to be held.

The details of my invention are hereinafter particularly described.

In the accompanying drawing, Figure 1 is a longitudinal elevation of my invention with the parts in their normal positions. Fig. 2, is a longitudinal section of the same. Fig. 3, illustrates the device inserted within a hole drilled in a solid substance, the tube being shown expanded. Fig. 4, is a section on the line $x$, $x$, of Fig. 3. Fig. 5, is an elevation of the expander detached. Fig. 6, is a rear view of the same. Fig. 7, is a rear view of the device with the parts in their normal positions. Fig. 8, is an interior view of one of the tube segments. Fig. 9, is a longitudinal section with the bolt and nut in reversed positions. Fig. 10, is a section on the line $x$, $x$, of Fig. 3, showing a slight modification, and Fig. 11, illustrates a modified shape of the bolt head and nut to be used with the modification shown in Fig. 10.

Similar reference characters denote like parts in all the views.

10, indicates a tube of any desired length and diameter. This tube is divided longitudinally into a plurality of sections of equal size. I prefer to employ four sections 1, 2, 3, 4, but if desired it may be divided into a greater number as shown in Fig. 10. The longitudinal edges of each section are beveled so that when assembled the outer surface of the tube is round in cross section. At one corresponding end, each tube section is provided with a flange 11, projecting inwardly at right angles and beveled on their sides to correspond with the beveled edges of the tube sections. The inner surface of each tube section is flat and inclined from the forward end toward and to the flange 11, at the opposite end.

12, indicates the expander which is located within the tube 10. This expander is preferably a rectangular metallic block having a smooth central longitudinal bore, and sides inclined inversely to the inclined inner surfaces of the tube sections.

13, designates a bolt screw-threaded at one end and provided with an integral head 14, at its other end. This bolt is adapted to be passed through the opening in the forward end of the tube 10, and into and through the smooth bore in the expander 12, when its screw-threaded end engages a nut 15, located within the tube 10, between the flanges 11, on the tube segments 1, 2, 3, 4, and the expander 12.

16, designates the article to be held by the bolt against the wall or floor. This object 16, is of course, provided with a hole through which the bolt 13, is passed.

In the outer surface of the tube 10, I form a spiral groove 17, into which is placed a spiral spring 18; the groove is made deep enough to allow the spring to be sunk below the surface of the tube 10, at all times. This spring is for the purpose of holding the tube sections together with the expander 12, and nut 15 in position within the tube in an unexpanded condition.

With the tube segments 1, 2, 3, 4, expander 12, nut 15, and spiral spring 18, assembled as described, the tube 10, is inserted into a recess or hole drilled in a solid substance 19; the hole being of larger diameter than the diameter of the tube in its normal condition. The screw-threaded end of the bolt 13, is then passed through a hole in the object 16, into the tube 10, through the smooth bore in the expander and into the nut 15. The fixed head 14, of the bolt now takes a bearing upon article 16 to be attached to or supported from or upon the wall or floor 19. Upon continuing the rotation of the bolt to the right, the nut 15, acting against the rear end of the expander 12, will draw the same forward, with its inclined sides sliding upon the inversely inclined inner surfaces of the tube sections 1, 2, 3, 4, thus gradually and uniformly expanding the tube 10, its entire length, so that a uniform circumferential bearing the entire length of the tube within the recess or hole is obtained, rendering it impossible for the tube to become loose or the bolt to be withdrawn without intentionally releasing the grip. The spiral spring 18 has only sufficient tension to hold the tube sections together in a normal position and readily expands with the tube as the expander is drawn forward.

It is sometimes desirable to first secure the expansion bolt within the hole or recess before placing the object to be secured to the wall or floor in position. My present invention permits of accomplishing this object with facility because of the reversibility of the bolt 13, and nut 15, as illustrated in Fig. 9. In such instance, the screw-threaded end of the bolt 13, is passed through the smooth bore of the expander 12, with the integral head 14, of the bolt in contact with the rear end of the expander, and the segments of the tube are assembled around the expander, the head of the bolt coming between the rear end of the expander and the flanges 11, upon the rear ends of the tube sections; after the spiral spring 18, has been arranged in the spiral groove 17, the device is inserted into a hole or recess in a wall or floor with the screw-threaded end of the bolt 13, projecting beyond the wall or floor. By hand, or preferably with the aid of a pair of pliers, the projecting end of the bolt 13, may be grasped and the bolt drawn forward, its fixed head causing the expander to slide forward over the inversely inclined inner surfaces of the tube sections, thus spreading them apart sufficiently to bear against the surrounding inner surface of the hole and retain the device therein while the object to be attached is placed in position with the screw-threaded end of the bolt 13, projecting through a hole therein, after which the nut 15, may be screwed upon the end of the bolt and tightened to the desired extent.

In the operation of my invention it will be seen that as the expander 12, is drawn forward its inclined sides sliding upon the inversely inclined and flat inner surfaces of the tube segments, all the sections of the tube will be uniformly spread so that upon the full expansion, the outer surfaces of the respective sections are parallel with each other giving the tube a uniform circumferential bearing the entire length of the tube within the recess or hole into which it is inserted.

I claim, as my invention:

1. A device of the character described, comprising a tube divided longitudinally into a plurality of sections, an expander within said tube provided with a smooth bore, a bolt passing through said bore and having an integral head at one end and screw threaded at its opposite end, a nut engaging said screw threaded end of the bolt, said bolt being reversible so that either its head or said nut may bear against the rear surface of the expander to move the same forward.

2. A device of the character described, comprising a tube divided longitudinally into a plurality of sections, and provided in its outer surface with a spiral groove, a spiral spring inserted in said groove, an expander within said tube provided with a smooth longitudinal bore, a bolt passing through said bore having an integral head at one end and screw threaded on its other end, and a nut engaged thereby acting against the rear surface of the expander to move the same forward and expand the tube sections when the bolt is rotated.

Signed by me this 7th day of October, 1915.

CHARLES J. CLEMENTS.

Copies of this patent may be obtained for five cents each, by addressing the "Commissioner of Patents, Washington, D. C."